United States Patent
Wankmueller

(10) Patent No.: US 7,146,344 B2
(45) Date of Patent: Dec. 5, 2006

(54) METHOD AND SYSTEM FOR MAKING SMALL PAYMENTS USING A PAYMENT CARD

(75) Inventor: John Wankmueller, New Hyde Park, NY (US)

(73) Assignee: MasterCard International Incorporated, Purchasen, NY (US)

( * ) Notice: Subject to any disclaimer, the term of this patent is extended or adjusted under 35 U.S.C. 154(b) by 659 days.

(21) Appl. No.: 10/100,793

(22) Filed: Mar. 19, 2002

(65) Prior Publication Data

US 2003/0033257 A1 Feb. 13, 2003

Related U.S. Application Data

(60) Provisional application No. 60/277,143, filed on Mar. 19, 2001.

(51) Int. Cl.
*G06Q 99/00* (2006.01)
*H06K 1/00* (2006.01)
*H04L 9/00* (2006.01)

(52) U.S. Cl. .............................. 705/80; 705/1; 705/38; 705/50; 705/64; 235/379; 379/91.01

(58) Field of Classification Search .................... 705/1, 705/50, 64, 80; 235/379; 186/35; 379/91.01
See application file for complete search history.

(56) References Cited

U.S. PATENT DOCUMENTS 5,465,206 A * 11/1995 Hilt et al. ..................... 705/40
5,557,516 A    9/1996  Hogan
5,692,132 A   11/1997  Hogan
5,699,528 A   12/1997  Hogan
5,704,046 A   12/1997  Hogan
5,995,948 A *  11/1999 Whitford et al. ............. 705/41
6,315,193 B1  11/2001  Hogan
6,330,551 B1* 12/2001 Burchetta et al. ............. 705/80
2002/0007302 A1* 1/2002 Work et al. ................... 705/10
2002/0077978 A1* 6/2002 O'Leary et al. ............... 705/40
2002/0156696 A1* 10/2002 Teicher ......................... 705/26
2003/0135453 A1* 7/2003 Caulfield et al. ............. 705/38
2004/0068473 A1* 4/2004 Cooper et al. ................ 705/75

OTHER PUBLICATIONS

Sung-Woo Tak et al., Modeling and Design of Notarial system Supporting Secure Transactions in Electronic Commerce Based on the Internet, SERI Distributed Computing Labratory, Network Computing Department, swtak@seri.re.kr.*

* cited by examiner

*Primary Examiner*—Kambiz Abdi
(74) *Attorney, Agent, or Firm*—Baker Botts LLP; Manu J Tejwani

(57) ABSTRACT

A system for conducting a financial transaction over a payment network is disclosed, which system includes a micropayment system interfaced with the payment network for allowing identification of the transaction as a micropayment transaction and allowing, at the option of the cardholder, repudiation of the micropayment transaction automatically by crediting the cardholder's account the amount of the micropayment transaction.

18 Claims, 5 Drawing Sheets

Repudiation Flow

Transaction Flow

Transaction Flow

Repudiation Flow

METHOD AND SYSTEM FOR MAKING SMALL PAYMENTS USING A PAYMENT CARD

PRIORITY APPLICATIONS

This application claims priority to U.S. provisional application No. 60/277,143 filed on Mar. 19, 2001, and entitled "Method and System for Making Small Payments Using a Payment Card," which is hereby incorporated by reference.

BACKGROUND

In today's commercial environment, payment cards—such as credit and debit cards—are ubiquitous methods of payment. These payment cards are issued by individual card companies or are issued by financial institutions that are members of a payment association (such as MasterCard® International Incorporated). As used in this application, the term "payment card" includes not only physical payment cards in which the payment account information is stored on a physical card, but also virtual payment cards in which the payment account information is stored in digital or electronic form.

A problem with conventional payment cards has been in using them for making small payments, also called "micropayments." The level below which a payment is considered a micropayment varies depending on the circumstance. A typical range for the threshold level for micropayments, however, is about $4 to $25.

Card issuers generally do not like cardholders to make micropayments on conventional payment cards because such transactions are not cost-effective for them. Of particular concern are the costs associated with micropayment repudiations, which are the costs incurred when a cardholder disputes a micropayment on a statement. Such costs include processing costs, costs associated with customer call centers facilities and equipment, and salaries for customer service representatives. To a lesser extent, the statement costs for separately itemizing micropayments on a statement are also a concern.

As an alternative to conventional payment cards, several different micropayment schemes have been suggested. By way of example, some schemes have introduced the concept of digital currency or tokens, which consumers would pay for using conventional payment methods and load in a digital wallet. Other schemes rely on aggregation, in which the micropayments are aggregated periodically by a micropayment provider and the aggregated amount is then charged to a payment card account.

One of the biggest obstacles with the existing micropayment schemes is that each scheme requires a merchant to install a micropayment provider's proprietary technology. Lacking widespread support in the marketplace for any one particular scheme, consumers are then required to register and open multiple accounts with multiple micropayment providers to purchase content from different merchants. This is obviously very inconvenient to consumers.

Therefore, there exists a need for a micropayment scheme that will work with conventional payment cards and that could be implemented by all merchants that accept conventional payment cards with little or no changes to their existing systems, while at the same time addressing the economic concerns of card issuers.

SUMMARY OF THE INVENTION

The present invention solves the foregoing need. In the present invention, a micropayment transaction being conducted through a conventional payment network is uniquely identified in some way as a "micropayment". Under the present invention, if an account holder repudiates a micropayment transaction, the repudiation is handled automatically—i.e., the account holder's account is automatically credited with the amount of the micropayment transaction. Since the repudiation is handled automatically, under the present invention, the issuer is not required to spend money to maintain a customer call center to handle disputed micropayment transactions.

In a preferred embodiment of the present invention, a party keeps a database of the individual micropayment transactions for a certain period of time, and the database is accessible to cardholders through some communication means known in the art (for example, by Internet or by telephone). If a cardholder repudiates a micropayment transaction in the database, a credit or refund to the cardholder's account is performed automatically (which would preferably be displayed on the cardholder's subsequent periodic statement).

Under the present invention, an issuer may elect whether or not to separately itemize micropayment transactions in a cardholder's periodic statement. If an issuer itemizes individual micropayment transactions in a cardholder's periodic statement, the issuer may include a reference number that identifies each micropayment transaction, and the cardholder may use such a reference number to repudiate a micropayment transaction. Preferably, the issuer would separate the micropayment transactions from other transactions (for example, list the micropayment transactions on a separate sheet or sheets). Preferably, the issuer would also provide instructions on how to repudiate a micropayment transaction, which would involve the use of an automatic system instead of calling a customer service representative. The automatic system may involve an interactive voice response unit (for using the telephone to repudiate micropayment transactions), a web interface (for using a web browser to repudiate micropayment transactions), and/or an email system (for using email to repudiate micropayment transactions).

In another embodiment of the present invention, the card issuer need not separately itemize the micropayment transactions on a cardholder statement. Instead, the micropayment transactions are aggregated either by the card issuer or by another party (for example, the payment card association through which the transactions were carried) and only the aggregated amount is presented to the cardholder on the cardholder's statement with one line item indicating the aggregated amount. To repudiate an individual micropayment transaction, a cardholder accesses the micropayment transaction database and uses information in this database to repudiate a micropayment transaction. The cardholder may access the database as explained above through any communication means known in the art, such as through the telephone or the Internet.

To prevent cardholder fraud, certain conditions associated with micropayment repudiation could be predefined, which would trigger an appropriate action. For example, the number of repudiations per payment account or per cardholder per period could be tracked, and after a certain threshold, appropriate action could be taken against the cardholder. The micropayment transaction database could also be statistically analyzed for merchant fraud.

BRIEF DESCRIPTION OF THE DRAWINGS

Exemplary embodiments of the present invention will now be described in detail with reference to the accompanying drawings in which.

DETAILED DESCRIPTION OF THE INVENTION

Figure 1:
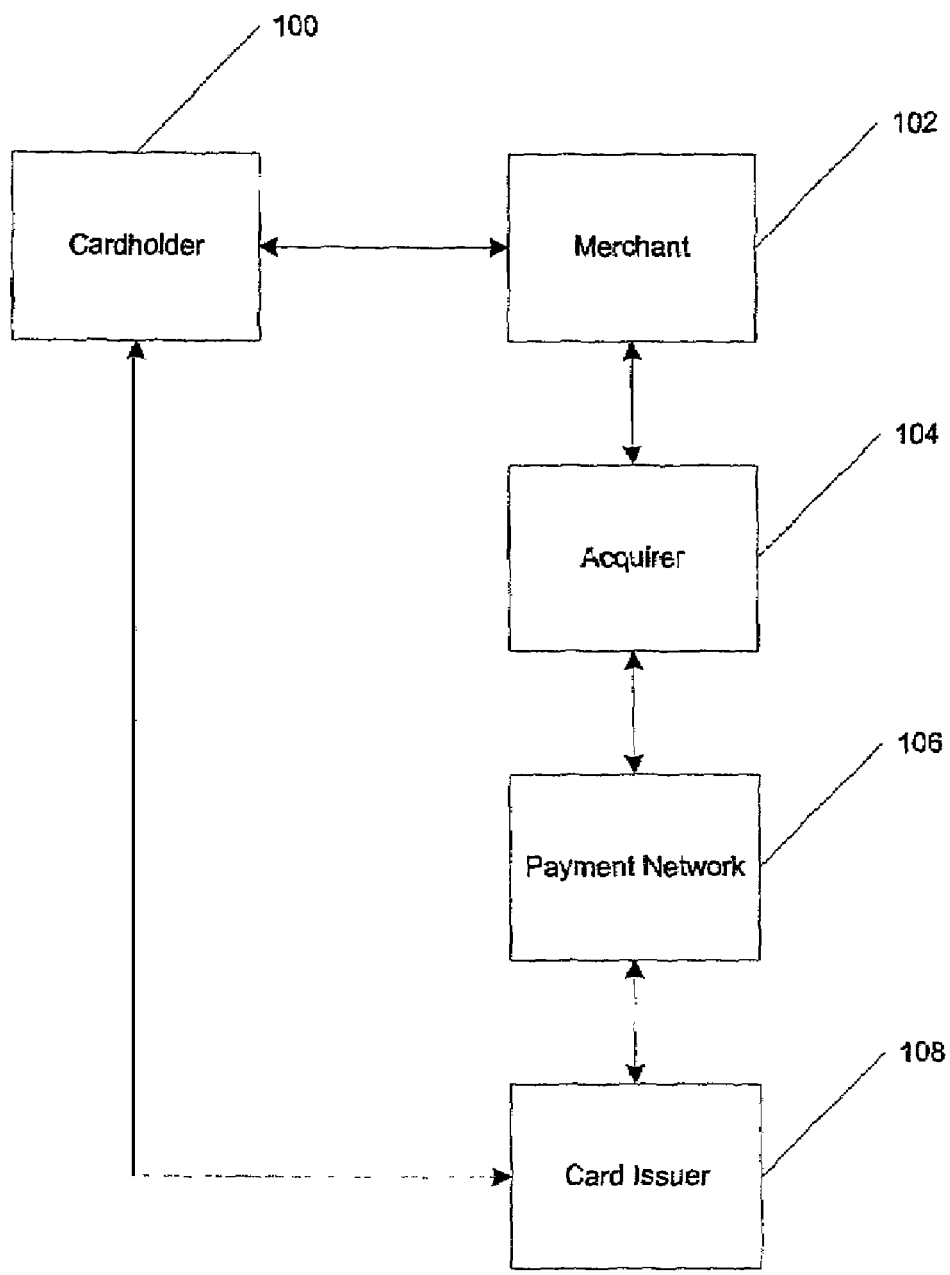
FIG. 1 is a functional block diagram showing the relationships of parties in a conventional payment association payment card system.

By way of background, FIG. 1 illustrates the relationships between the parties involved in a conventional payment association payment card system. The cardholder 100 is issued a payment card by the card issuer 108. When the cardholder desires to purchase goods or services from a merchant 102, the cardholder 100 presents his or her payment card (either in-person or over the telephone or Internet) to the merchant 102. The merchant 102 has a relationship with an acquirer 104, which has access to a payment network 106. The acquirer is typically a financial institution or bank in which the merchant has a financial account. The card issuer 108 is also in communication with the payment network 106. When the merchant is presented with the cardholder's payment card, the merchant 102 requests authorization for the transaction from the acquirer 104. The acquirer in turn forwards the authorization request through the payment network to the card issuer. Based upon the cardholder's account status and the amount of the transaction, the card issuer authorizes or denies the authorization request. The card issuer's response is routed through the payment network and the acquirer to the merchant.

Figure 2:
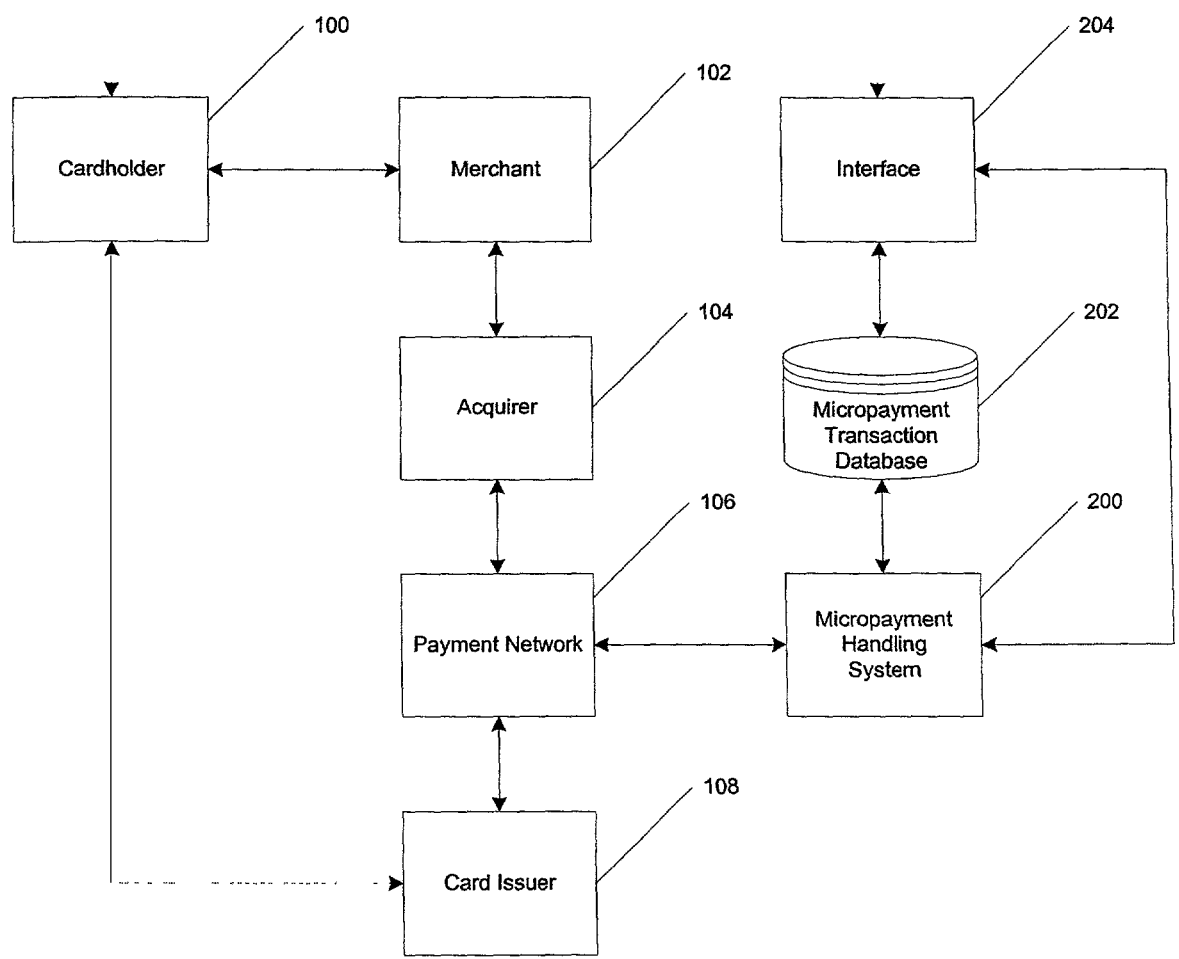
FIG. 2 shows a payment card system according to an exemplary embodiment of the present invention.

FIG. 2 shows a payment card system according to an exemplary embodiment of the present invention. The relationships between the cardholder 100, merchant 102, acquirer 104, payment network 106, and card issuer 108 are the same as described in relation to FIG. 1. In this case, however, the payment network either incorporates or communicates with a micropayment handling system (MHS) 200. The MHS 200 incorporates or communicates with a micropayment transaction database (hereafter referred to as the "MDB"). The MHS handles the micropayment transactions that pass through the payment network, including storing the micropayment transaction information in the MDB. The cardholder 100 has access to the MDB through any means known in the art. Preferably, the cardholder 100 has access to the MDB through a telephone or web interface 204.

Figure 3A:
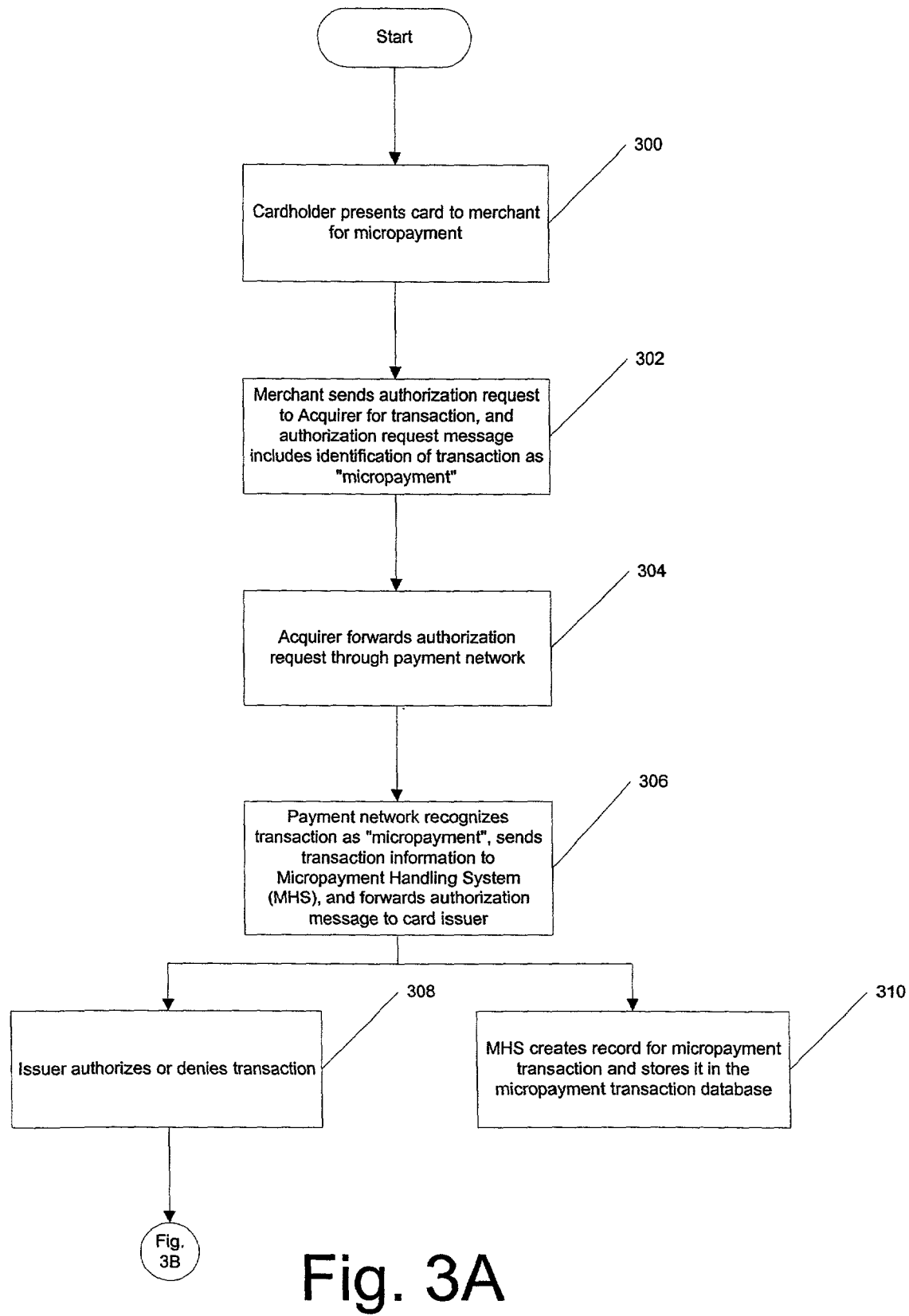
FIGS. 3A and 3B show flow charts of a transaction according to an exemplary embodiment of the present invention.
Figure 3B:
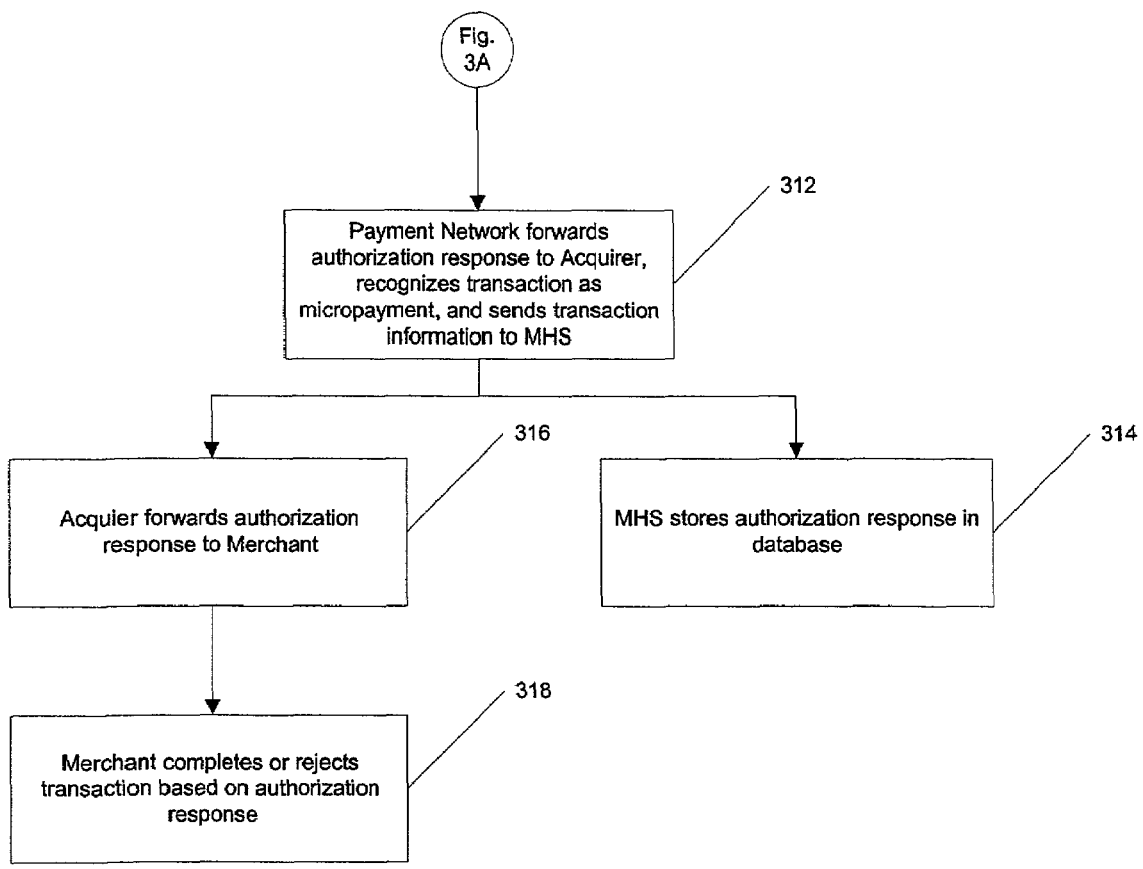

FIGS. 3A and 3B show flow charts of a transaction according to an exemplary embodiment of the present invention. In step 300, a cardholder presents a payment card to a merchant for a transaction involving a micropayment. The payment card may be any type of payment card known in the art. For example, it could be a physical payment card (such as a plastic credit card), or it could be a virtual payment card (such as a payment account number stored in a software application). The presentment of the payment card may be in any form, such as face-to-face (card-present), over the telephone, or over the Internet. Although the present invention may be utilized with any type of merchant, the present invention is especially advantageous for use with Internet merchants.

In step 302, the merchant sends an authorization request to the acquirer for a micropayment transaction. As an example, during a typical point-of-sale (POS), card-present transaction, the merchant will swipe a payment card in a POS terminal that is in communication with the acquirer, and the terminal will send an authorization request to the acquirer. When the transaction is conducted over the Internet, the merchant will receive cardholder information over the Internet (usually by the cardholder filling out an online form), and the merchant will generate an authorization request using this cardholder information.

In the present invention, the authorization request message includes an identification of the transaction as a micropayment transaction. This may be accomplished in a number of ways. For example, one or more new fields may be inserted in the authorization request message, the value of which will indicate a micropayment transaction. Preferably, however, one or more existing fields in the authorization request message are used, and a new value or combination of values for these existing fields is defined as indicating a micropayment transaction. For example, if an existing data element in the authorization message has an undefined value, a new value in that data element (previously undefined) may be defined as indicating a micropayment transaction. As another example, a combination of the amount, merchant, and/or merchant type may be used to indicate a micropayment transaction.

The micropayment identification may be performed manually by the merchant or the cardholder or it may be based on transaction-based parameters. If performed manually by the merchant or the cardholder, the merchant may require new or modified terminals (in the case of POS merchants) or new or modified software (in the case of Internet merchants) that have an appropriate input device or mechanism to indicate a micropayment transaction. In the case of a POS merchant, the input device may be a button or combination of buttons on a terminal, or the input device may be a separate card reader to be used only in conjunction with micropayment transactions. In the case of an Internet merchant, the input mechanism may be a software button, check list, drop-down list, or data entry field on a purchase order screen that the cardholder clicks on, selects, or enters data in to indicate a micropayment.

The micropayment identification may also be based on transaction-based parameters. As a simple example, a micropayment may be indicated by transactions involving amounts less than a predefined threshold amount. Although any threshold amount may be selected, by way of example, the threshold amount may be $4. Hardware or software at any point along the transaction authorization path could then be configured or programmed with this parameter to recognize micropayment transactions. When a micropayment transaction is recognized, such hardware or software could forward the transactional information to a micropayment handling system (as described below) or it could insert an identification in the transaction message (as described above) indicating that the transaction is a micropayment for further processing along the authorization path.

Returning to FIG. 3, in step 304, the acquirer sends the authorization request message to the payment network. In step 306, the payment network recognizes the transaction as a micropayment transaction (because of the identification of such in the transaction message). Accordingly, the payment network forwards the transaction information to the MHS and forwards the authorization message to the proper card issuer.

In step 308, the card issuer authorizes or denies the transaction based on the transaction details and the status of the cardholder's account. The card issuer recognizes the transaction as a micropayment and, when statements are printed, the card issuer need not individually itemize these transactions. Instead, the card issuer (or a third party processor) may aggregate the micropayment transactions for the statement period and print only the aggregated amount. Alternatively, the MHS may aggregate these payments for each card issuer and send the aggregated amounts to the card issuers for each statement period.

In step 310, the MHS creates a record for and stores the micropayment transaction in the MDB.

After the card issuer sends a response to the authorization request, in step 312, the payment network forwards the authorization response to the acquirer and, recognizing the transaction as a micropayment, sends the authorization response to the MHS.

In step 314, the MHS stores the authorization response in the MDB.

In step 316, the acquirer forwards the authorization message to the merchant.

In step 318, the merchant completes or rejects the transaction based on the authorization response. Assuming that the merchant receives a positive authorization, the merchant is then guaranteed payment under the rules of the major payment associations.

When a cardholder receives his or her statement, the micropayment transactions may or may not be individually itemized on the statement. If the micropayment transactions are not individually itemized on the statement, there will be only one line item for micropayment transactions, which will be the aggregated amount of all micropayment transactions for that statement period. In this case, to examine information about a particular micropayment transaction, the cardholder must access the MDB through interface 204 (see FIG. 2).

Figure 4:
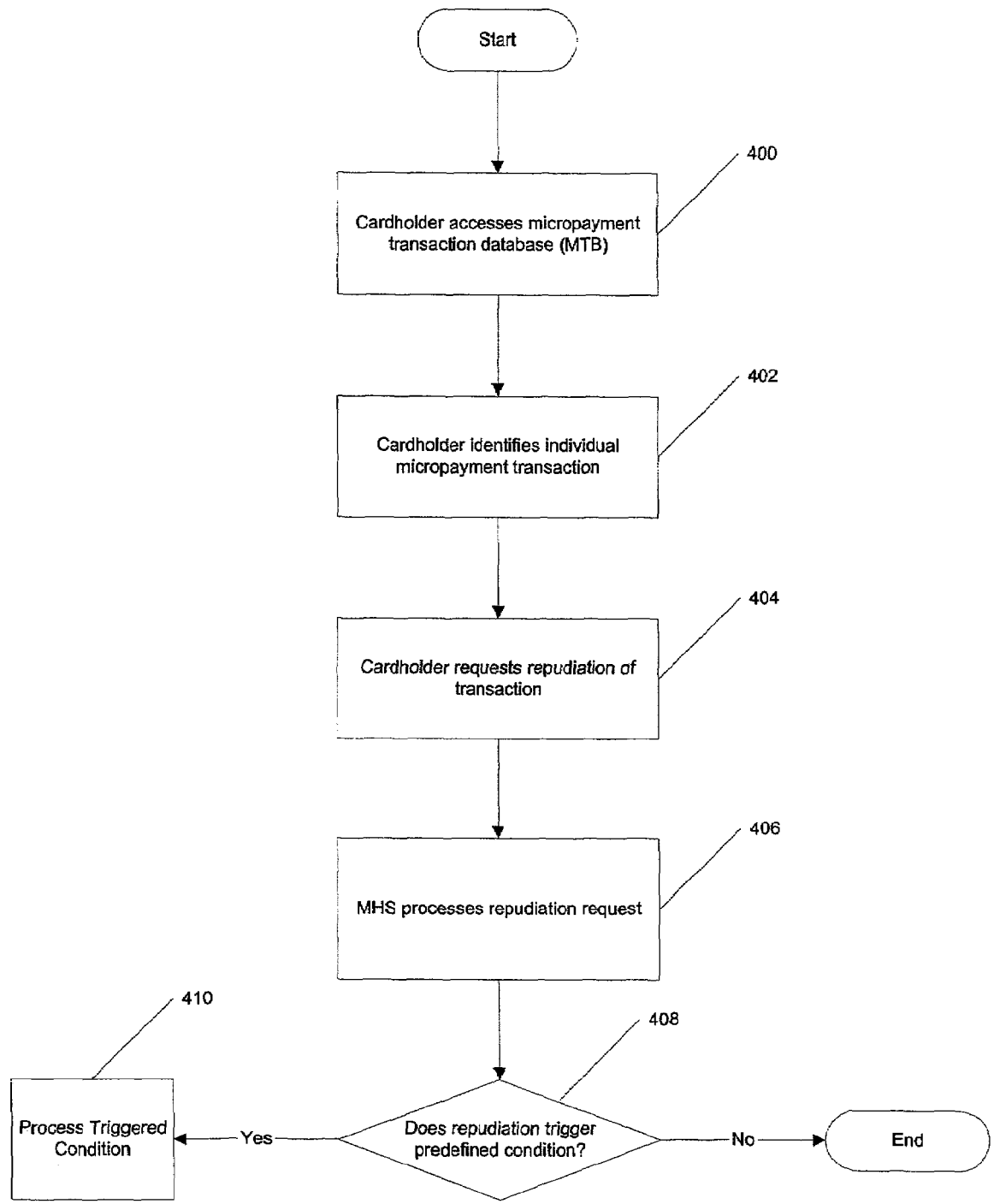
FIG. 4 shows a flow chart of a repudiation according to an exemplary embodiment of the present invention.

Turning to FIG. 4, this figure shows a flow chart of a repudiation according to an exemplary embodiment of the present invention. In step 400, a cardholder who desires to repudiate a micropayment transaction accesses the MDB. A cardholder may access the MDB through any available technology, but familiar and convenient interfaces for most cardholders are the telephone and the World Wide Web. At a minimum, the cardholder provides the payment account number used to make the disputed transaction. Preferably, appropriate security measures (which are known in the art) are used to authenticate the cardholder. For example, the cardholder may provide a personal identification number (PIN). In step 402, the cardholder identifies the specific micropayment transaction that the cardholder desires to repudiate. If the micropayment transactions are individually itemized on the cardholder's statement, a reference number may be provided on the statement. Alternatively, and in the case where micropayment transactions are not individually itemized on a cardholder's statement, a cardholder may identify an individual micropayment transaction using the interface to the MDB. In step 404, the cardholder repudiates the specific micropayment transaction. This repudiation may be accomplished in any feasible manner. For example, if the interface is a telephone interface, the cardholder may be asked to press a specific button on the telephone, or if the interface is a Web interface, the cardholder may click on an appropriate button on his or her computer screen. Alternatively, the cardholder could be asked to send a written request for repudiation through mail or email, including in the request an identifier of the specific micropayment transaction.

In step 406, the MHS receives the repudiation request from the cardholder. It processes the repudiation automatically (i.e., credits the cardholder's account for the amount of the transaction) without any investigation or query into whether the transaction was validly executed. The issuer may bear the cost of this automatic credit. When a repudiation is processed automatically, the issuer may still decide, at its option, whether or not to proceed with a chargeback (in which the issuer attempts to receive a credit from an acquirer). It may be the case that, because of the processing costs involved, it will not make economic sense for an issuer to proceed with a chargeback. The MHS also stores the repudiation request in a database (either the MDB or another database) which contains or links to a database containing certain conditions under which certain actions may be taken, such as generating a report or other message regarding the cardholder to the card issuer. For example, a report or message may be generated if the cardholder has repudiated more than a predefined number of micropayment transactions in any particular period. The report or message may be sent to the card issuer, which may take appropriate action, such as warning the cardholder, canceling the cardholder's ability to perform micropayments with an account number, or canceling the cardholder's account. In step 408, the MHS determines whether the repudiation by the cardholder triggers any predefined conditions. If the repudiation does not trigger any conditions, then the processing is complete. If the repudiation does trigger any conditions, then the MHS takes the action associated with the triggered condition, such as generating a report or message to the card issuer.

The advantages of the present invention include:

No cardholder registration for micropayment service is required. The cardholder receives the service by use of an already applied-for and issued payment card. (Of course, a card issuer may decide to provide the micropayment service as an option to cardholders, in which case some sort of registration process may be involved. This process, however, should be simpler than signing onto a completely separate micropayment scheme provider, since the cardholder already has a relationship with the card issuer.)

Merchants are required to make little or no changes to their existing systems.

Existing payment methodologies and infrastructure may be utilized.

Ease of implementation and guaranteed payments under existing payment methodologies should assure widespread adoption by merchants.

Card issuers do not need to separately itemize micropayments on cardholder statements.

Card issuers do not incur the conventional costs associated with handling cardholder repudiation.

I claim:

1. A method for conducting a financial transaction by a cardholder, having a payment card and an associated account, through a conventional payment network, linking card issuers, merchants and/or acquirers, the method comprising, conducting said financial transaction with said payment card oversaid conventional payment network;

identifying said financial transaction as a micropayment transaction;

giving the cardholder the option to repudiate said micropayment transaction in response to the cardholder's repudiation of said micropayment transaction, automatically crediting said account an amount of said micropayment transaction independent of further inputs from the card issuer, merchant and/or acquirer.

2. The method of claim 1 further comprising:
providing a database for storing said micropayment transactions conducted by one or more cardholders over a certain period of time;
allowing access to said database by said one or more cardholders over a communications network;
utilizing said database to identify the micropayment transaction to be repudiated.

3. The method of claim 2, further comprising: providing said cardholder with a statement which presents said micropayment transactions in the aggregate.

4. The method of claim 1 further comprising:
providing said cardholder with a statement itemizing said micropayment transaction;
assigning a reference number to each such micropayment transaction; utilizing said reference number in repudiating said micropayment transaction.

5. The method of claim 4 further comprising:
separating on said statement said micropayment transactions.

6. The method of claim 1, wherein said repudiation of said micropayment transaction involves use of an automatic system comprising one or more of an interactive voice response unit, a web interface and an email system.

7. The method of claim 6, further comprising:
defining one or more conditions required to be satisfied before allowing said repudiation to occur.

8. The method of claim 7, wherein said one or more conditions comprises tracking the number of repudiations per account and disallowing said repudiation or transaction after a threshold number of repudiations.

9. The method of claim 7, wherein said one or more conditions comprises tracking the number of repudiations per cardholder and disallowing said repudiation or transaction after a threshold number of repudiations.

10. A system for conducting a financial transaction, comprising:
an issuer which issues a payment card to a cardholder having an associated account;
an acquirer which receives an authorization request from a merchant to whom said payment card is presented for conducting said transaction;
a payment network through which said authorization request is transmitted, said network receiving said request and forwarding it to said issuer of said payment card and receiving said card issuer's response and routing said response back to said acquirer;
a micropayment system interfaced with said payment network for allowing, at the option of said cardholder, repudiation of said micropayment transaction if it is a micropayment transaction automatically by crediting said account the amount of said micropayment transaction, independent of any further inputs from the issuer, merchant and acquirer.

11. The system of claim 10 wherein said micropayment system comprises:
a micropayment handling system to process said micropayment transactions; and a micropayment transaction database to store said micropayment transaction information, and wherein said cardholder has access to said database through a communication network to achieve said repudiation.

12. The system of claim 10 wherein transaction-based parameters comprising one or more of the transaction amount, said merchant and a type of merchant, indicate whether said transaction is a micropayment transaction.

13. The system of claim 10 wherein said authorization request identifies said financial transaction as a micropayment transaction.

14. The system of claim 13 wherein said authorization request comprises a plurality of fields one or more of which having a value indicative of said micropayment transaction.

15. The system of claim 10 wherein said merchant indicates whether said transaction is a micropayment transaction.

16. The system of claim 10 wherein said cardholder indicates whether said transaction is a micropayment transaction.

17. The system of claim 11 wherein said micropayment system aggregates the micropayment transactions and sends the aggregates to said card issuers.

18. The system of claim 11 wherein said repudiation is effected through an input device connected to said micropayment handling system.

* * * * *